Patented July 10, 1951

2,560,319

UNITED STATES PATENT OFFICE 2,560,319

HEAT-STABLE PLASTICIZED AMINO-TRIAZINE RESIN COMPOSITIONS

Herbert J. West, Pittsburgh, Pa., and Henry M. Enterline, Riverside, Conn., assignors to American Cyanamid Company, New York, N. Y., a corporation of Maine No Drawing. Original application January 4, 1945, Serial No. 571,368, now Patent No. 2,437,657, March 9, 1948. Divided and this application September 10, 1947, Serial No. 773,316

1 Claim. (Cl. 260—45.3)

This invention relates to plasticizing amino plastic resins such as urea-aldehyde resins, aminotriazine-aldehyde resins, thiourea-aldehyde resins, dicyandiamide-aldehyde resins, etc.

Alkyd resins modified with fatty oils have been used as plasticizers for amino resins but in each instance there is a tendency to discolor if the compositions are heated at relatively high temperatures such as for example in the baking of coating compositions containing such materials. The compositions which have been used previously were customarily modified with fatty acids having relatively long hydrocarbon chains, e. g. 18 carbon atoms. The mixed fatty acids contained in the natural glyceride, such as coconut oil have been used either as such or in partially purified form. However, it has been found that even with the highest grades of refined coconut oil acids enamels containing alkyd resins prepared from such acids discolor upon baking.

An object of this invention is to provide resinous plasticizers for various amino resins of the type mentioned which are highly resistant to discoloration upon heating at elevated temperatures.

This and other objects are attained by the use of an alkyd resin modified with a saturated monocarboxylic acid containing from 6 to 10 carbon atoms but with no aliphatic acid containing more than 10 carbon atoms and no aliphatic unsaturated acid as a plasticizer for any of the various amino resins. Our new plasticizers are particularly suitable for use in coating compositions containing a urea-formaldehyde resin, an aminotriazine-formaldehyde resin, e. g., a melamine-formaldehyde resin, etc. The amino resins used in coating compositions are generally of the alkylated type such as butylated urea-formaldehyde resins, butylated melamine-formaldehyde resins, etc.

The following examples in which the proportions are in parts by weight are given by way of illustration and not in limitation.

Example 1

148 parts of phthalic anhydride
100 parts of glycerine
110 parts of capric acid ($C_9H_{19}COOH$)

These substances are heated at about 220° C. until a resin having an acid number of about 4 is obtained, generally requiring about 6–10 hours. About 1 part of the product thus produced is mixed with about 1 part (solids basis) of butylated urea-formaldehyde resin (dissolved in butyl alcohol and diluted with xylene or other suitable organic solvents or diluents). The resulting mixture is applied as a coating to various materials such as steel objects. The composition is dried and baked at a temperature of about 250–300° F. A light colored coating which does not discolor appreciably during the baking is obtained. The coating has good flexibility and excellent adhesion to the metal. Similar results are obtained if a butylated melamine-formaldehyde resin be plasticized with the capric acid modified glyceride resin. Of course, the melamine-formaldehyde resin compositions are inherently more light stable and more chemically resistant than the urea-formaldehyde resin. In many instances it may be desirable to use mixed melamine-urea-formaldehyde resins and our plasticizers are also quite suitable for such materials.

Example 2

148 parts of phthalic anhydride
100 parts of glycerine
110 parts of 2-ethyl hexoic acid These substances are heated together at 200–220° C. until a resin having a relatively low acid number is obtained, e. g. an acid number of 4–10, generally requiring from about 6–10 hours.

The product thus produced is suitable for plasticizing urea-formaldehyde resins, melamine-formaldehyde resins, mixed urea-melamine-formaldehyde resins, etc., in the same general manner as described in Example 1. Again there is no discoloration upon baking.

Other aliphatic acids containing between 6 and 10 carbon atoms may be substituted for all or part of the capric or 2-ethyl hexoic acids used in the above examples, e. g. caproic acid, caprylic acid, heptoic acid, pelargonic acid, etc. Obviously various mixtures including two, three, four or more of any of these acids may be used if desirable. The hydroxy aliphatic acids, containing 6–10 carbon atoms, e. g. ω-hydroxy decanoic acid, may be used in place of part or all of the non-hydroxylated fatty acids.

Various polyhydric alcohols may be substituted for all or part of the glycerine used in the above examples, e. g. ethylene glycol, di-, tri-, tetra-, penta-, hexa-, octa-ethylene glycols, decamethylene glycol, 1,3-butylene glycol, α-propylene glycol, octadecanediol, etc. The resins may also be modified if desired with small proportions of monohydric alcohols.

Other dicarboxylic acids or the corresponding anhydride may be substituted for part or all of the phthalic anhydride, e. g. succinic, adipic, sebacic, azelaic, maleic, fumaric, terephthalic acids, endo-methylene tetraphthalic anhydride etc. The term acid as used herein is intended to include the acid anhydride as well as the acid itself.

The proportion of our plasticizer may be varied considerably. For best results it is preferable that about 2/3 to 4 parts of plasticizer be used per part of the amino plastic resin.

Various dyes or pigments may be incorporated in the compositions containing an amino resin and a plasticizer of the type described herein. Examples of these are: titanium oxide, ferric oxide, Prussian blue, toluidine red, chrome green, chrome yellow, etc.

If desirable, acid or basic catalysts, e. g. phosphoric acid, phthalic acid, sodium carbonate, etc. may be included in the compositions in order to harden the amino resin more rapidly in accordance with principles known in the art.

Plasticizers such as dibutyl phthalate and other alkyl esters of phthalic acid, tricresyl phosphate, toluene sulfonamid etc., may also be included in the compositions described above if desirable.

Among the resins which may be plasticized with the alkyd resins described herein are those obtained by reacting an aldehyde, e. g. formaldehyde, polymers of formaldehyde, acetaldehyde, benzaldehyde, etc., with one or more of the following: urea, thiourea, dicyandiamide, guanidine, the reaction products obtained by heating and decomposing dicyandiamide, aminotriazines such as melamine, etc. Phenol and the substituted phenols such as the alkyl phenols may be included with any of the various amino compounds just mentioned. Mixed resins such as urea-melamine-formaldehyde resins, urea-thiourea-formaldehyde resins, etc., may be prepared by reacting the aldehyde with each of the other reactants separately and mixing the resulting products or the aldehyde may be reacted with a mixture of the other reactants.

In the production of urea-formaldehyde resins it is preferable that the formaldehyde to urea ratio be between about 2:1 and 3:1 whereas in the preparation of melamine-formaldehyde resins it is preferable that the formaldehyde to melamine ratio be between about 3:1 and 6:1. Higher or lower ratios may of course also be employed.

These amino resins are preferably alkylated with a suitable alcohol, e. g. ethanol, propanol, butanol, amyl alcohol, cyclohexanol, benzyl alcohol, etc. To prepare alkylated amino resins, the amino compound such as urea is generally condensed with an aqueous solution of formaldehyde and the alcohol which is to be used for alkylation is added to the resulting aqueous syrup. The mixture is then azeotropically distilled and the water is separated by means of a suitable water trap. Usually the alkylated resins are dissolved in, or diluted with, organic solvents such as the alcohols just mentioned, xylene, toluol, etc.

Coating compositions containing our new plasticizers together with an amino resin when used with light colored pigments are especially suitable as regfrigerator enamels, stove enamels, medicine cabinet enamels, etc. The non-pigmented compositions are suitable for use as clear lacquers on metal, wood, etc. Compositions containing an amino resin and our plasticizers are also of value with dark pigments although color changes are not so apparent when dark pigments are used.

Our plasticizers appear to be substantially stable against discoloration when heated at temperatures up to about 450° F. for relatively long periods of time. On the other hand alkyd resin plasticizers containing long chain fatty acids discolor quite rapidly when heated at temperatures of about 450° F. for similar periods of time.

This application is a continuation-in-part of our abandoned copending application Serial No. 329,056, filed April 11, 1940 and a divisional of our application Serial No. 571,368, filed January 4, 1945, now Patent No. 2,437,657, March 9, 1948.

Obviously many modifications and variations in the processes and compositions described above may be made without departing from the spirit and scope of the invention as defined in the appended claim.

We claim:

A resinous butylated melamine-formaldehyde condensation product which is a reaction product of melamine, formaldehyde and a butyl alcohol plasticized with a resinous reaction product of phthalic acid, glycerol and 2-ethyl hexoic acid.

HERBERT J. WEST.
HENRY M. ENTERLINE.

REFERENCES CITED

The following references are of record in the file of this patent:

UNITED STATES PATENTS

| Number | Name | Date |
| --- | --- | --- |
| 2,181,231 | Groggins et al. | Nov. 28, 1939 |
| 2,187,566 | Bruson | Jan. 16, 1940 |
| 2,218,474 | Moore | Oct. 15, 1940 |
| 2,227,223 | Hodgins et al. | Dec. 31, 1940 |

FOREIGN PATENTS

| Number | Country | Date |
| --- | --- | --- |
| 377,265 | Great Britain | July 18, 1932 |
| 395,894 | Great Britain | July 27, 1933 |
| 532,532 | Great Britain | Jan. 27, 1941 |

OTHER REFERENCES

Lewkowitsch "Chemical Technology and Analysis of Oils, Fats and Waxes," 6th ed., vol. 11, pages 655 and 656.